(12) United States Patent
Yamamoto

(10) Patent No.: US 6,239,884 B1
(45) Date of Patent: May 29, 2001

(54) SCANNER AND METHOD OF CONTROLLING LIGHTING COLD-CATHODE TUBE THEREOF

(75) Inventor: Tetsuichiro Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/501,924

(22) Filed: Feb. 10, 2000

(30) Foreign Application Priority Data

Feb. 15, 1999 (JP) .................................................. 11-035188

(51) Int. Cl.⁷ ...................................................... H04N 1/04
(52) U.S. Cl. .................................. 358/475; 355/30; 362/6
(58) Field of Search ................................... 359/196, 197; 358/474, 475, 483; 355/30; 362/6

(56) References Cited

U.S. PATENT DOCUMENTS 4,098,552 * 7/1978 Okukawa .................................. 358/30

* cited by examiner

Primary Examiner—James Phan
(74) Attorney, Agent, or Firm—Ostrolenk, Faber, Gerb & Soffen, LLP

(57) ABSTRACT

A scanner according to the present invention includes a cold-cathode tube for radiating light on a manuscript reading position where an image on a manuscript is detected by an image sensor, a pre-heater for preheating before the lighting of the cold-cathode tube, a light source for detection connected to the pre-heater in series for radiating light toward the manuscript reading position to detect the end of the manuscript, a detecting element for detecting light reflected in the manuscript reading position from the light source for detection and generating a detection signal showing that the end of the manuscript is detected and a driving circuit for controlling the lighting of the cold-cathode tube and the stop of the pre-heater according to the detection signal from the detecting element. The lighting of the light source for detection and preheating by the pre-heater can be controlled with common power by connecting the pre-heater and the light source for detection for detecting the end of a manuscript in series and in addition, the lighting of the light source for detection and preheating can be simultaneously started.

10 Claims, 4 Drawing Sheets

SCANNER AND METHOD OF CONTROLLING LIGHTING COLD-CATHODE TUBE THEREOF

BACKGROUND OF THE INVENTION

1. Field of the Invention

The present invention relates to a scanner and a control method for controlling lighting a cold-cathode tube which is a light source of the scanner.

2. Description of the Related Art

FIGS. 4A and 4B show the configuration of a conventional type scanner connected to a computer and others and used for a reader for reading an image on a manuscript.

As shown in FIG. 4A, in the conventional type scanner 1, an image sensor not shown for reading a manuscript 50 is installed so that it can indirectly read the manuscript via a lighting plate 52.

Also, a cold-cathode tube, for example, a cold-cathode fluorescent lamp 20 is mainly provided between the lighting plate 52 and the manuscript to enhance resolution when the manuscript 50 is read and a pre-heater 30 is provided for pre-heating the cold-cathode fluorescent lamp 20.

Referring to the drawings, the cold-cathode fluorescent lamp 20 and the pre-heater 30 will be described below.

FIG. 4B is a sectional view showing the configuration of the cold-cathode fluorescent lamp of a scanner shown in FIG. 4A.

As shown in FIG. 4B, the cold-cathode fluorescent lamp 20 is formed by applying fluorescent paint to a part of the inner wall of a bulb 2a made of quartz and depositing or applying reflection coatings 2b and 2c on the outside face corresponding to the applied area of the above bulb 2a. Hereby, the cold-cathode fluorescent lamp has directivity of emitting all light emitted from the cold-cathode fluorescent lamp 20 from a radiation aperture 2d provided by the reflection coatings 2b and 2c. The pre-heater 30 for preheating the cold-cathode fluorescent lamp 20 to predetermined temperature is attached to the whole surface of the reflection coating 2c.

Even if the cold-cathode fluorescent lamp 20 is used under a low-temperature condition, luminance to an extent required for a light source for scanner can be acquired by energizing the pre-heater 30 and increasing the surface temperature of the cold-cathode fluorescent lamp 20 up to approximately 50° C. by the pre-heater 30.

The conventional type scanner has the following problems.

The cold-cathode fluorescent lamp used in the conventional type scanner has a defect in a temperature characteristic that the quantity of light and the luminance of the cold-cathode fluorescent lamp do not become stable unless fixed time elapses after the cold-cathode fluorescent lamp is lighted because gas filled inside is not stable at low temperature.

The above characteristic causes a defect that unless only the cold-cathode fluorescent lamp is lighted beforehand and normal reading operation is started after time elapses to some extent if a scanner is used, an image sensor cannot fetch a stable image.

Also, to supplement the above defects, there is a method of always lighting only the cold-cathode fluorescent lamp even while a scanner is not used and immediately realizing normal operation when an image is read; however, there is a defect that as the cold-cathode fluorescent lamp is lighted even when a scanner is unused, power is often uselessly consumed.

Also, only when a manuscript is scanned, the cold-cathode fluorescent lamp can be immediately lighted by providing the above pre-heater and always heating the cold-cathode fluorescent lamp in place of always lighting the cold-cathode fluorescent lamp. However, in this case, as the pre-heater is driven as long as the power source of the scanner is turned on, power is greatly wasted.

SUMMARY OF THE INVENTION

The present invention is made in view of the above problems in prior art and the object is to provide a scanner and a method of controlling lighting a cold-cathode tube of the scanner wherein enough operation is enabled, saving the power consumption of the cold-cathode tube and a pre-heater.

Further, another object of the present invention is to provide a scanner wherein the above object can be achieved with simple configuration.

A scanner according to a first invention includes a cold-cathode tube for emitting light in a manuscript reading position where an image on the manuscript is detected by an image sensor, a pre-heater for preheating the cold-cathode tube before the cold-cathode tube is lighted, a light source for detection connected to the pre-heater in series for detecting for emitting light toward the manuscript reading position to detect the end of the manuscript, a detecting element for detecting light emitted from the light source for detection and reflected in the manuscript reading position and generating a detection signal showing that the end of the manuscript is detected, and a driving circuit for controlling the lighting of the cold-cathode tube and the stop of the pre-heater according to the detection signal from the detecting element.

The lighting of the light source for detection and the preheat by the pre-heater can be controlled with common power by connecting the light source for detection for detecting the end of a manuscript to the pre-heater in series and in addition, the lighting of the light source for detection and preheating can be simultaneously started. Hereby, the individual control of the lighting of the light source for detection and preheat by the pre-heater is not required and wiring can be simplified. Also, the detection synchronous with preheating of a manuscript in the manuscript reading position is enabled.

The driving circuit controls the stop of the pre-heater when the detecting element detects the end of a manuscript while detecting manuscript reading operation by the scanner. Therefore, not only the wait time of the scanner in operation is reduced but also unnecessary electrification can be avoided and power consumption can be reduced.

In the present invention, if the pre-heater is connected to both ends of the light source for detection, not only power consumption is reduced but the area of the cold-cathode tube to which heat from the pre-heater is applied is increased and power used for the scanner can be efficiently utilized.

In the present invention, it is desirable that the pre-heater is provided in the vicinity of the surface (the shielding face) on the reverse side to the manuscript reading position based upon the cold-cathode tube. In this case, the light source for detection and the pre-heater can be prevented from intercepting light from the cold-cathode tube and reducing luminous radiation efficiency onto a manuscript.

In the present invention, the driving circuit is concretely connected to a series circuit composed of the pre-heater and the light source for detection and is provided with a first power supply circuit for supplying driving power for simultaneously enabling the preheat of the pre-heater and the lighting of the light source for detection and a second power supply circuit for lighting the cold-cathode tube. Further, the first power supply circuit is characterized in that it starts the supply of power before the second power supply circuit lights the cold-cathode tube and stops the supply of power according to a detection signal from the detecting element.

Hereby, the pre-heater and the cold-cathode tube can be independently driven. As the preheat of the pre-heater and the lighting of the light source for detection are stopped when the cold-cathode tube is lighted, there is no useless power consumption.

As the first power supply circuit starts the supply of power when a manuscript is first set, preheat can be started at the same time as the manuscript is set and useless power consumption is prevented.

A method of controlling lighting a cold-cathode tube in the scanner according to a second invention is characterized in that a pre-heater for preheating the cold-cathode tube and a light source for detection for detecting a manuscript are simultaneously energized. The method has the steps of: detecting a run of the manuscript; energizing the pre-heater for preheating the cold-cathode tube responsive to a detection of the run, and simultaneously energizing a light source for generating a detection light for detecting an end of the manuscript; sensing a reflected light of said detection light which reflect from a reading position of said scanner to detect the end of the manuscript; stopping energizing said pre-heater and said light source in response to the detection of the end of the manuscript; and then lighting said cold-cathode tube.

Hereby, when the scanner is used, the cold-cathode fluorescent lamp is efficiently preheated and the wait time of the scanner in operation can be reduced.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE PREFERRED EMBODIMENT

Figure 1:
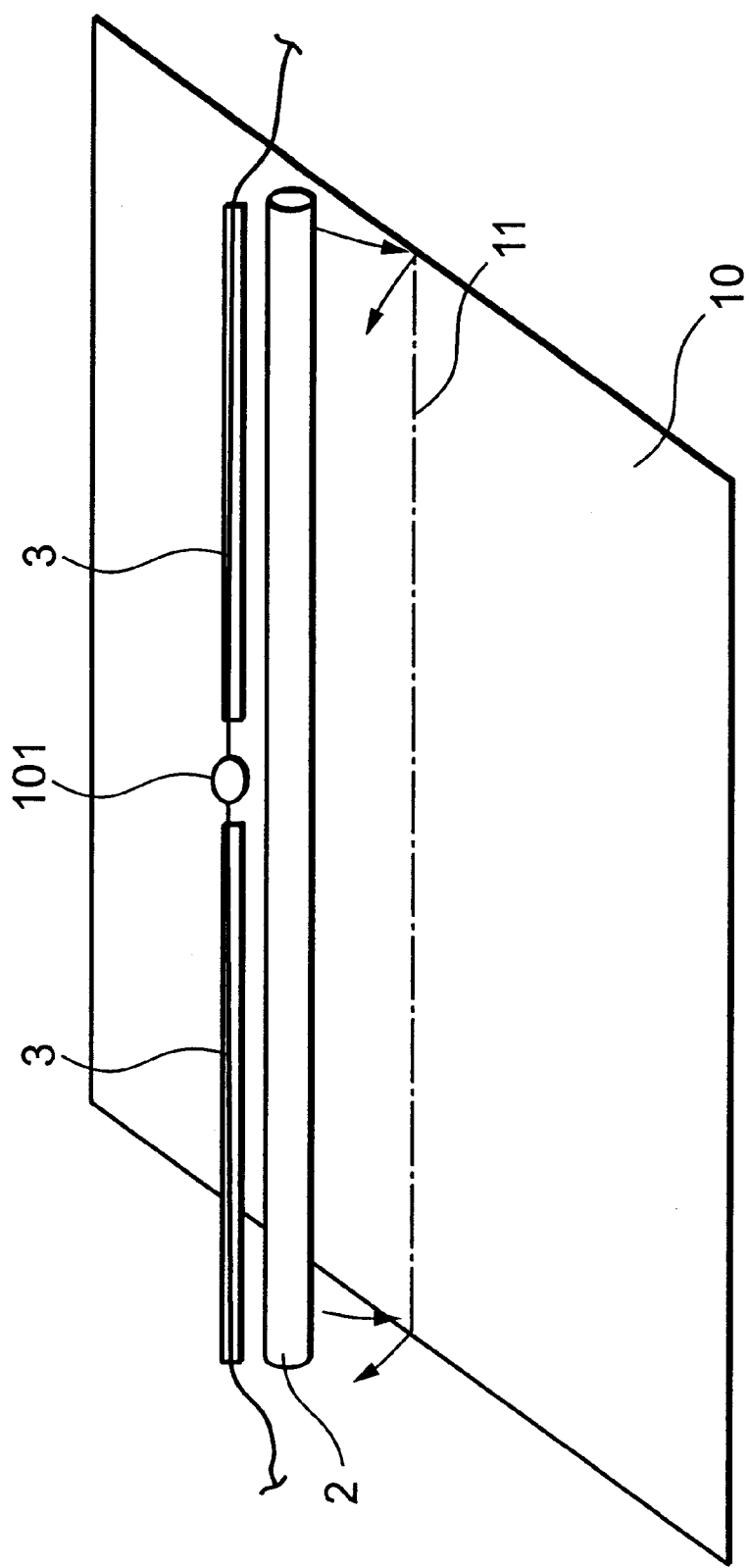
FIG. 1 shows the configuration of a cold-cathode fluorescent lamp and a pre-heater in an embodiment of a scanner according to the present invention.

Referring to the drawings, an embodiment of a scanner according to the present invention will be described below.

FIG. 1 is a sectional view showing the configuration of a cold-cathode fluorescent lamp and a pre-heater in the embodiment of the scanner according to the present invention. However, the embodiment of the scanner according to the present invention will be described as a sheet feeder type scanner in which a manuscript is run.

As shown in FIG. 1, a light source part of the scanner according to the present invention is provided with a cold-cathode fluorescent lamp 2 which is a main light source, pre-heaters 3 arranged in the vicinity of the cold-cathode fluorescent lamp and LED for detection 101.

It is desirable that the cold-cathode fluorescent lamp 2 is a cold-cathode light source including mercury to reduce lighting time. It is desirable that the length of the cold-cathode fluorescent lamp 2 is longer than the width in the scanned direction of a manuscript 10.

LED for detection 101 for detecting the end of a manuscript is installed in the vicinity of the center of the cold-cathode fluorescent lamp 2 and two pre-heaters 3 are connected in series via LED for detection 101 with LED for detection 101 between the two pre-heaters. LED for detection 101 may not necessarily be also arranged in a straight line with the pre-heaters 3; however, LED for detection shall meet a condition that it is connected to the pre-heater in series.

Figure 2:
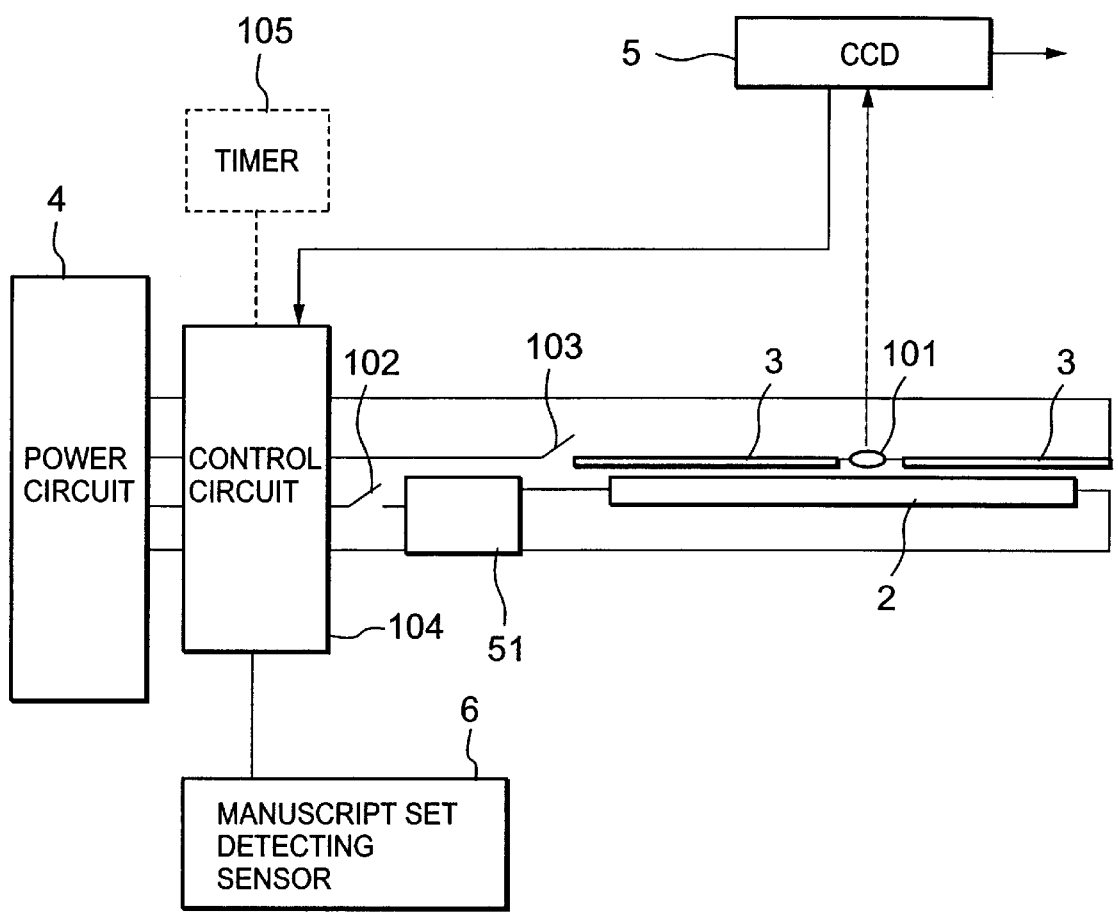
FIG. 2 is a bloc diagram showing the configuration in the embodiment of the scanner according to the present invention.

FIG. 2 is a block diagram showing the configuration of the scanner equivalent to the embodiment of the present invention. As shown in FIGS. 1 and 2, the pre-heaters 3 is installed in the vicinity of the back face of the cold-cathode fluorescent lamp 2. In this case, the back face means the reverse side to a manuscript reading position 11 shown in FIG. 1 on which light from the cold-cathode fluorescent lamp 2 is irradiated.

The pre-heaters 3 may be also arranged close to the cold-cathode fluorescent lamp 2 and may be also directly wound on the cold-cathode fluorescent lamp 2. However, it is desirable that no pre-heater 3 is arranged in a direction in which the manuscript 10 is irradiated. A reflecting function is provided to the pre-heaters 3, light from the cold-cathode fluorescent lamp 2 is reflected by the pre-heater 3, may be also directed toward the manuscript reading position 11 and simultaneously, the cold-cathode fluorescent lamp 2 is preheated from the back face by heat from the pre-heaters 3.

The installed position of LED for detection 101 is devised so that light output from it can irradiate the manuscript reading position 11 shown in FIG. 1. Light from LED for detection 101 reflected in the manuscript reading position 11 is received by CCD 5 shown in FIG. 2 and the end of the manuscript 10 is detected. A detection signal is output to a control circuit 104. CCD 5 is electrically connected to a power circuit 4 via the control circuit 104 to supply power to CCD.

CCD 5 also functions as an image sensor for reading an image on the manuscript 10 by reflected light in the manuscript reading position 11 from the cold-cathode fluorescent lamp 2. However, CCD may be also provided separately from a manuscript reading image sensor as a detecting element for detecting the end of a manuscript that detects light from LED for detection 101.

As shown in FIG. 2, the pre-heaters 3 and LED for detection 101 are electrically connected to the control circuit 104 via a switch 103, and the cold-cathode fluorescent lamp 2 and a glow starter 51 are electrically connected to the control circuit 104 via a switch 102. The control circuit 104 controls the switches 102 and 103 to supply power to the cold-cathode fluorescent lamp 2 and a series circuit composed of LED for detection 101 and the pre-heaters 3 from the power circuit 4.

Therefore, the power circuit 4 is provided with the function of a first power supply circuit for supplying power to the pre-heaters 3 and LED for detection 101 and the function of a second power supply circuit for supplying power for lighting the cold-cathode tube 2. The control circuit 104 controls their power supply.

Further, a manuscript set detecting sensor 6 is connected to the control circuit 104. The manuscript set detecting sensor 6 is a sensor for detecting that the manuscript 10 is first set on the scanner. The set manuscript is fed to the manuscript reading position 11 shown in FIG. 1 by one sheet at a time by a feed roller not shown and light reflected in the manuscript reading position 11 from the cold-cathode fluorescent lamp 2 is read by CCD 5 (or another image sensor) not shown.

Next, referring to the drawings, a control method in the embodiment of the scanner according to the present invention will be described below.

Figure 3:
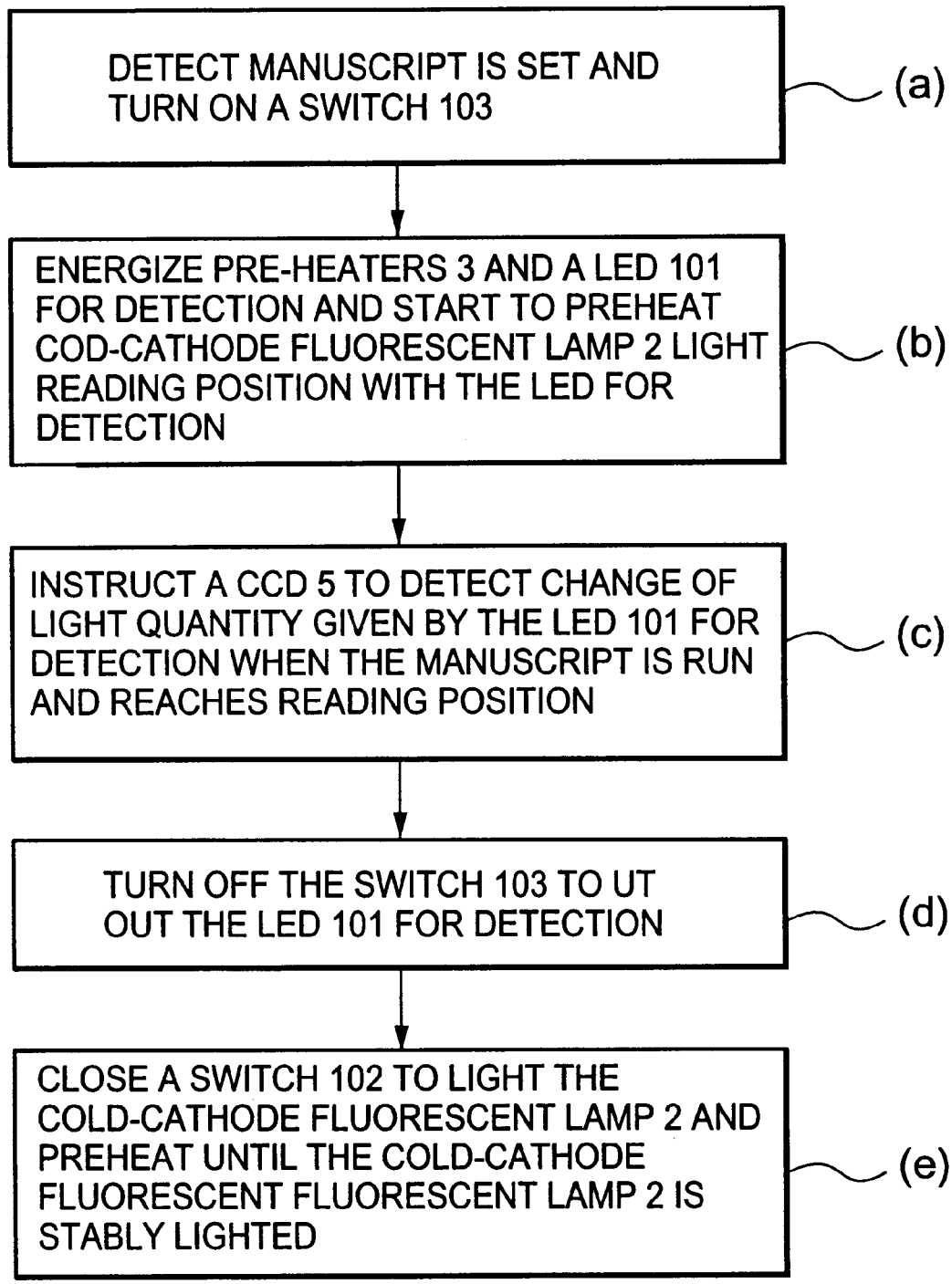
FIG. 3 is a flowchart showing a method of controlling lighting a cold-cathode tube in the embodiment of the scanner according to the present invention.
Figure 4A:
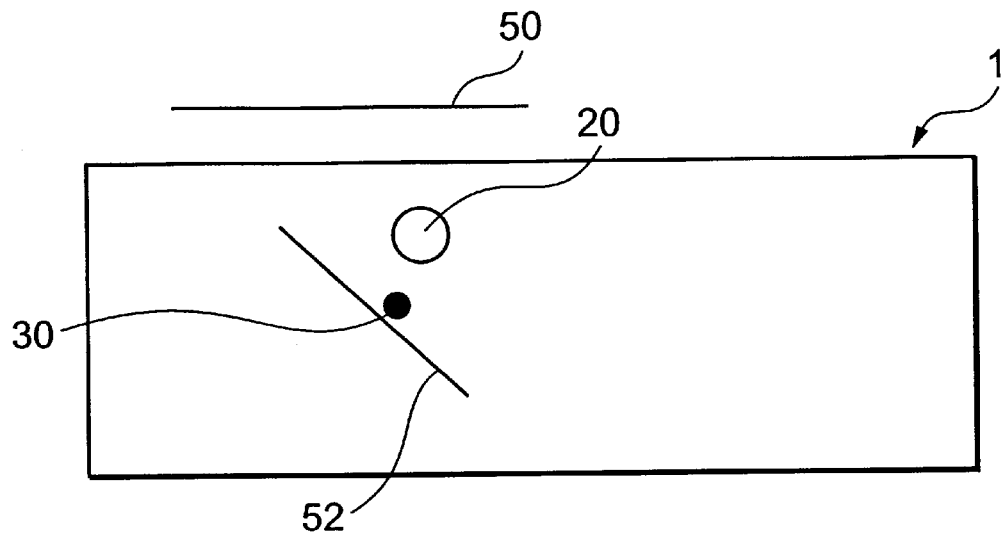
FIG. 4A is a sectional view showing the configuration of a conventional type scanner.
Figure 4B:
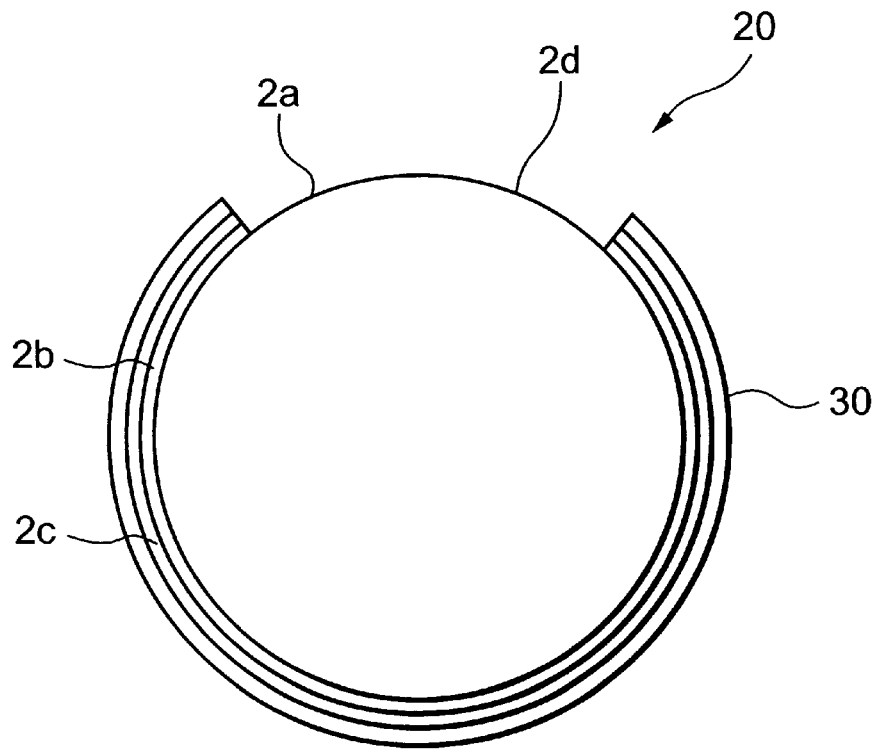
FIG. 4B is a sectional view showing the configuration of a conventional type cold-cathode tube.

FIG. 3 is a flowchart showing the lighting control method in the embodiment of the scanner according to the present invention.

Referring to FIG. 2 and the flowchart shown in FIG. 3, description is given below.

First, as shown in a step (a) shown in FIG. 3, when the manuscript set detecting sensor 6 shown in FIG. 2 detects that a manuscript is set, the control circuit 104 closes the switch 103. Hereby, as shown in a step (b), power from the power circuit 4 is supplied to the pre-heaters 3 and LED for detection 101, they are energized and the preheat of the cold-cathode fluorescent lamp 2 is started. The control circuit 104 also drives CCD 5 together with the start of the preheat of the cold-cathode fluorescent lamp 2. Hereby, light output from LED for detection 101 irradiates the reading position 11 shown in FIG. 1 at the same time as the preheat and its reflected light is monitored by CCD 5.

In the step (b), the manuscript 10 set on the scanner is not run yet. When the manuscript 10 is carried by the feed roller not shown according to designation from an operator, the end of the manuscript 10 shown in FIG. 1 reaches the reading position 11 as shown in a step (c). As light reflected by the end of the manuscript is not detected by CCD 5 unless the end of the manuscript 10 reaches the reading position 11, the cold-cathode fluorescent lamp 2 is not lighted yet.

In the step (c), when the end of the manuscript 10 reaches the reading position 11, the change of the reflected light from LED for detection 101 is detected by CCD 5. When the change is recognized by the control circuit 104, the control circuit 104 opens the switch 103 as shown in a step (d) and at the same time that the control circuit puts out LED for detection 101, it also intercepts preheat by the pre-heater.

By this time, the cold-cathode fluorescent lamp 2 is preheated by the pre-heater 3. To take sufficient time for preheating, a timer 105 is provided to the control circuit 104 as shown by a broken line shown in FIG. 2 and the switch 103 may be also opened after time for preheating elapses. In this case, the timer 105 counts preheating time since the manuscript is detected by the manuscript set detecting sensor 6.

Next, as shown in a step (e), the run of the manuscript 10 is once stopped, the switch 102 is closed, the cold-cathode fluorescent lamp 2 is lighted, the run of the manuscript 10 is started again according to reading speed for reading operation and operation for reading the manuscript 10 is executed.

The switch 102 connected to the cold-cathode fluorescent lamp 2 is closed until the reading of all manuscripts set on the scanner is finished and when the reading of all manuscripts is finished, the switch 102 is opened according to an instruction from the control circuit 104.

Effect produced by the above-described scanner will be described below.

First, the cold-cathode fluorescent lamp 2 is efficiently preheated when the scanner is used and the wait time in the operation of the scanner can be reduced.

Second, as the pre-heaters 3 is energized when the scanner is used, unnecessary power consumption is not required.

Third, the lighting of LED for detection and preheat can be controlled with common power by connecting the pre-heaters 3 and LED for detection 101 for detecting the end of a manuscript in the manuscript reading position in series and in addition, the lighting of LED for detection and preheat can be simultaneously started. Hereby, the individual control of the lighting of LED for detection and preheat is not required and wiring can be also simplified. Also, a manuscript can be detected in the manuscript reading position in synchronization with preheat.

Also, as a state of the manuscript reading operation of the scanner is detected by lighting LED for detection and detecting the above state by CCD and electrification when it is not required can be avoided as a result by controlling the operation and the stop of the pre-heater according to the result of the above detection, power consumption can be reduced.

The present invention is not limited to the above embodiment. For example, LED is used for a light source for detection for detecting the end of a manuscript in the manuscript reading position, however, a light emitting element other than LED may be also used.

Also, CCD is used for a detecting element for receiving light from LED for detection, however, another light receiving element may be also used. Also, a position in which LED for detection is connected is not required to be between two pre-heaters. Also, a position in which LED for detection is arranged may be also any position if the above position has only to be in the vicinity of the cold-cathode tube even if the above position is not in the center of the cold-cathode tube.

For a detecting element for detecting the end of a manuscript, a part of the part for reading a manuscript and receiving light of an image sensor for reading a manuscript may be also utilized and may be also a light receiving element formed in such an image sensor and independent of the part for reading a manuscript and receiving light. Or a light receiving element completely separated from an image sensor may be also used. In the case of the former, a detecting element can also function as an image sensor, there is an advantage that wiring is simple and in the case of the latter, there is an advantage that a detecting element can be installed in any position.

The pre-heater may be also in the shape of a plate, a tube or a net. Also, the pre-heater may be also a film formed on the surface of the cold-cathode tube.

The scanner according to the present invention is not only utilized in a dedicated reader, a facsimile, a copying machine, a printer and others but is utilized in all information communication devices.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A scanner provided with an image sensor for recognizing an image on a manuscript, comprising:
   a cold-cathode tube for radiating light on a manuscript reading position where an image on a manuscript is detected by said image sensor;
   a pre-heater for preheating before said cold-cathode tube is lighted;
   a light source for detection connected to said pre-heater in series for radiating light toward said manuscript reading position and detecting the end of the manuscript;
   a detecting element for detecting light reflected in said manuscript reading position from said light source for detection and generating a detection signal showing that the end of the manuscript is detected; and
   a driving circuit for controlling the lighting of said cold-cathode tube and the stop of said pre-heater according to a detection signal from said detecting element.

2. The scanner according to claim 1, wherein:
   said pre-heater is connected to both ends of said light source for detection.

3. The scanner according to claim 1, wherein:
   said light source for detection and said pre-heater are provided in the vicinity of said cold-cathode tube.

4. The scanner according to claim 1, wherein:
   said pre-heater is provided in the vicinity of the surface on the reverse side to said manuscript reading position based upon said cold-cathode tube.

5. The scanner according to claim 1, wherein:
   said driving circuit is provided with a first power supply circuit connected to a series circuit composed of said pre-heater and said light source for detection for supplying driving power for simultaneously enabling preheating by said pre-heater and the lighting of said light source for detection and a second power supply circuit for lighting said cold-cathode tube; and
   said first power supply circuit starts the supply of power before said second power supply circuit lights said cold-cathode tube and stops the supply of power according to said detection signal.

6. The scanner according to claim 5, wherein:
   said first power supply circuit starts the supply of power when a manuscript is first set.

7. The scanner according to claim 1, wherein:
   said light source for detection is LED.

8. The scanner according to claim 1, wherein:
   a detecting element is formed in said image sensor for reading a manuscript.

9. The scanner according to claim 1, wherein:
   a detecting element is composed of a part of the light receiving part of said image sensor for reading a manuscript.

10. A method of controlling lighting a cold-cathode tube in a scanner for scanning an image on a manuscript, comprising the steps of:
    detecting a run of the manuscript;
    energizing a pre-heater for preheating the cold-cathode tube responsive to a detection of the run, and simultaneously energizing a light source for generating a detection light for detecting an end of the manuscript;
    sensing a reflected light of said detection light which reflect from a reading position of said scanner to detect the end of the manuscript;
    stopping energizing said pre-heater and said light source in response to the detection of the end of the manuscript; and
    then
    lighting said cold-cathode tube.

* * * * *